Patented Jan. 29, 1952

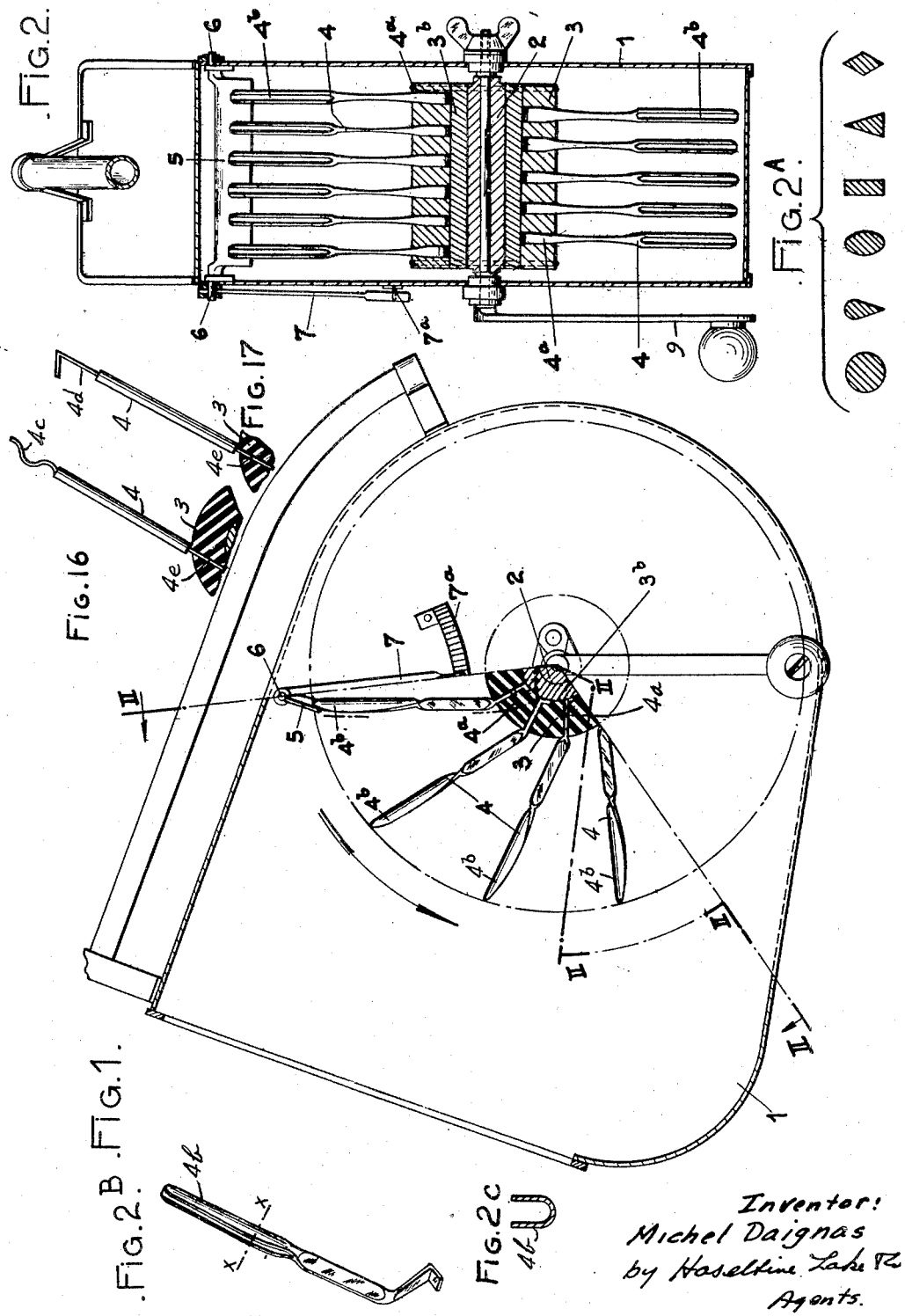

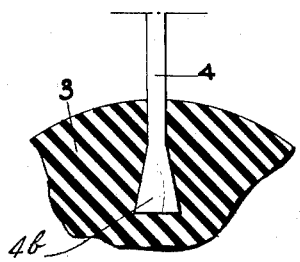
FIG. 3.
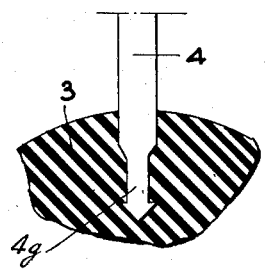
FIG. 4.
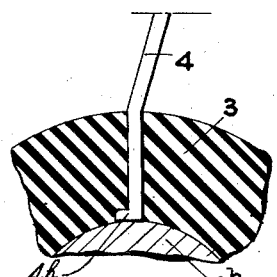
FIG. 5.
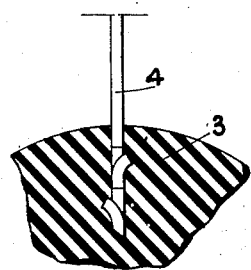
FIG. 6.
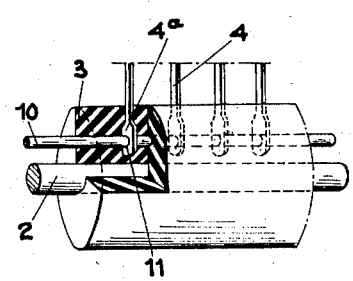
FIG. 7.
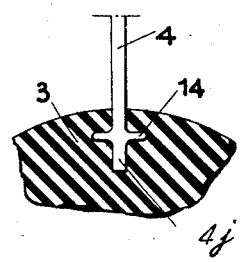
FIG. 8.
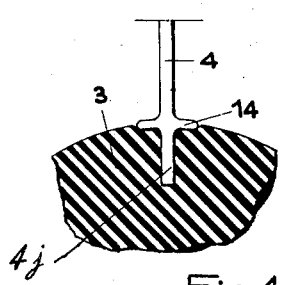
FIG. 9.
FIG. 10.    FIG. 11.    FIG. 12.
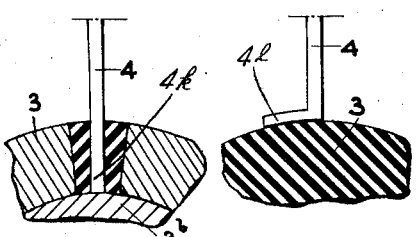
FIG. 13.    FIG. 14.    FIG. 15.
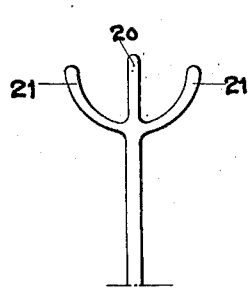
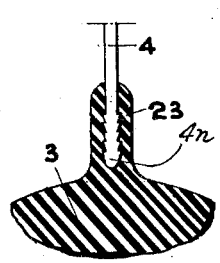
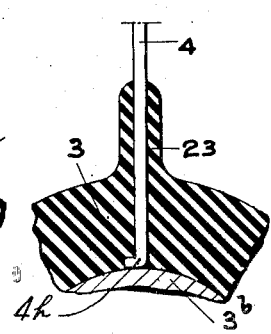
Inventor:
Michel Daignas
by Haseltine Lake & Co.
Agents

2,583,767

UNITED STATES PATENT OFFICE 2,583,767

MECHANICAL PARGETING APPARATUS

Michel Daignas, Nice, France

Application August 7, 1947, Serial No. 767,072
In France September 26, 1938

Section 1, Public Law 690, August 8, 1946
Patent expires September 26, 1958

13 Claims. (Cl. 91—44)

Mechanical pargeting apparatus are known of the type comprising: a casing provided with gripping means, a rotor formed by a shaft provided with a hub on which are secured flexible rods or flexible blades which, during the rotation of the rotor are in scraping engagement by their free ends with an abutment which curves them, the releasing of the flexible blades when they escape from the abutment causes a projection of the material previously stored in the casing and picked up by the ends of said flexible blades, owing to the catapulting effect generated by the stored-up energy.

These apparatus do not give satisfaction as the blades very rapidly break at the base. The zones of vibration of the blades are located in the vicinity of the bases which causes, in these regions, a rapid molecular transformation of the metal and consequently the breaking of the blades.

It has also been proposed to make the hub of rubber with grooves formed according to generatrices and in which are engaged the backs of combs the teeth of which are constituted by flexible blades located outside the hub. As previously indicated, the flexible blades break after a relatively short time of use, the rubber hub having practically no action for damping the oscillations.

Pargeting apparatus are also known in which the rotor is constituted by juxtaposed discs made of rubber and so shaped at the periphery as to form blades made of hardened rubber. For giving a sufficient strength to these blades, the latter must have a large cross-section so that the empty space between said rubber blades is considerably reduced. Owing to this fact, a cramming of the material occurs between the various blades, thereby causing defective operation.

The present invention has for object to provide pargeting machines of the type comprising a casing with a throwing rotor constituted by a hub provided with blades and an abutment situated in the path of the outer ends of said blades, and is characterised by the combination with a hub made of resiliently distortable material such as rubber, of rigid blades carried by said hub or subjected to the action of the latter.

In order that the invention may be clearly understood and readily carried into effect, it will now be described with reference to the accompanying drawings in which:

Fig. 1 is an elevation partly in section of a mechanical pargeting apparatus constructed according to the invention.

Fig. 2 is a transverse section along the line II—II of Fig. 1.

Fig. 2A illustrates various possible transverse sections of the projection blades.

Fig. 2B is a perspective view of one form of a projection blade.

Fig. 2C is a section on line X—X of Fig. 2B.

Figs. 3, 4, 5 and 6 illustrate different manners of effecting the mounting of the blades in the hub.

Fig. 7 is a partly broken away perspective view of another embodiment of the invention.

Figs. 8, 9, 10, 11 and 12 illustrate other embodiments of mountings.

Fig. 13 shows a blade forming a trident.

Figs. 14 and 15 illustrate other embodiments.

Figs. 16 and 17 show still further embodiments of blades.

The mechanical pargeting apparatus, which is only shown by way of example, in particular in Figs. 1 and 2, comprises a casing 1 and a rotor formed by a metal shaft 2 on which is mounted a tubular hub 3 made of rubber or of material capable of performing the same function.

The tubular hub 3 may be made of one piece of rubber or the like or it may comprise an outer part made of rubber or the like and an inner filling part 3b made of any appropriate material.

In this embodiment, the throwing members are formed by blades 4 which are rigid in principle and the bases of which are engaged in the rubber hub 3. In any case, the catapulting force is obtained from the resiliency of the hub or the like and not from the blades. The base 4a of the blades may be radial as shown in Fig. 1 or inclined rearwardly as shown at 4e in Figs. 16 and 17, this latter arrangement enabling a better projection to be obtained, the material projected by the end of a blade passing over the blades placed in front. The ends 4b of the blades are constructed to be gutter-shaped, as can be seen in greater detail in Fig. 2B. Said ends may however be corrugated as at 4c in Fig. 16 or cranked as at 4d in Fig. 17 or of any desired shape which enhances the projection.

The throwing blades are tensioned, owing to the local deformation of the hub, by an abutment formed by a plate 5 secured to a shaft 6 on which is fixed an outer arm 7, the end of which is adapted to engage in the teeth of a quadrant 7a.

The shaft 2 is rotated by means of a crank 9.

In the example of Figs. 1 and 2, the blades 4 may be obtained from rigid blades, one of the ends 4b of which forms a projection member whereas the other end 4a is anchored in the rubber hub. Owing to this arrangement, the blades 4 cannot rotate in the rubber hub. The blades may have any appropriate cross-section that prevents material being deposited in other parts than the throwing parts. The chief advantageous cross-sections for the blades 4 are more particularly shown in Fig. 2A.

The blades are arranged in staggered relation or in any other manner.

Figs. 3, 4, 5 and 6 illustrate various embodiments of the bases 4b, 4g and 4h for obtaining the anchoring of said bases in the rubber hub. These explanatory figures do not require a special description. However, the heel illustrated in Figs. 5 and 15 has proved advantageous.

Fig. 7 illustrates a modification in which the blades are anchored by a rod 10 which is or is not oblique relatively to a generatrix and which engages in corresponding perforations 11 provided in the bases of the blades 4.

In the example of Fig. 8, the base 4j of each blade 4 carries a collar 14 which is engaged in the hub 3. Fig. 9 shows a modification in which the collar 14, which is arranged at the periphery of the hub 3, is firmly secured to the corresponding part of said hub by cementing and in particular by vulcanization of the rubber. In the previous embodiments, in which the bases are engaged in slots previously formed in the hub, a partial vulcanization of the rubber may be effected around the bases of the rods.

Fig. 10 shows an embodiment in which the base 4k of each blade 4 is surrounded with a mass of rubber, the various masses of appropriate cross-section being engaged in corresponding perforations of the hub 3 which may be made of a rigid or a resiliently deformable material.

In the example of Fig. 11, the bases of the blades 4 are formed by heels 4l which are fixed to the periphery of the rubber hub 3 by vulcanization or any other appropriate means.

Fig. 12 illustrates another embodiment in which the bent ends 4m of the blades 4 are pivoted at 18 in a casing surrounding the rubber hub 3, said bent ends 4a forming heels which bear on the periphery of the rubber hub 3. Said heels 4m may be connected to the hub by vulcanization or they may be provided with an anchoring projection 19 shown in chain dotted lines.

Fig. 13 shows, by way of example only, an embodiment of the outer projection end of a rigid blade 4. Said end, which has the shape of a trident or the like is provided with a central tooth 20 which is longer than the lateral teeth 21. The central tooth 20 is alone adapted to bear against the abutment 5 of the apparatus.

Another embodiment of a hub made of rubber or the like and provided with rigid blades, is more particularly shown in Fig. 14. The hub 3 is shaped to form peripheral rubber teeth 23 in which blades 4 are engaged. In a modification shown in Fig. 15 the rigid blades are not only engaged in the teeth 23 but also in the hub 3 according to any one of the previously described embodiments. Furthermore, the blade root may be toothed or barbed as at 4n in Fig. 14.

What I claim is:

1. A pargeting machine comprising a casing into which material is fed, an adjustable transverse plate supported by said casing, a rotary throwing rotor mounted in the casing with its axis parallel to the plate and having a hub made of resiliently distortable material, rigid blades carried by said hub, anchoring means integral with said blades for attaching the blades to the hub the free ends of said blades extending from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

2. A pargeting machine comprising a casing into which material is fed, an adjustable transverse plate supported by said casing, a rotary throwing rotor mounted in the casing with its axis parallel to the plate and having a hub made of resiliently distortable material, rigid blades carried by said hub and extending therefrom to contact said plate so as to have a scraping contact therewith, anchoring means integral with said blades for attaching the blades to the hub, the part of the hub comprised between two successive blades being successively compressed and extended when said blades are successively in scraping engagement with said plate for generating a catapulting effect without flexion of said blades, and means for adjusting the relative position of said plate with respect to said casing with a view to vary said catapulting effect.

3. A pargeting machine comprising a casing into which material is fed, an adjustable transverse plate supported by said casing, a rotary throwing rotor mounted in the casing with its axis parallel to the plate and having a hub made of resiliently distortable material, rigid blades carried by said hub, anchoring means integral with said blades for attaching the blades to the hub the free end of each of said blades extending sufficiently from said hub to be momentarily retained by said plate to store up energy through distortion of said hub for generating a catapulting effect, and means for adjusting the relative position of said plate with respect to said casing with a view to vary said catapulting effect.

4. A pargeting machine comprising a casing into which material is fed, an adjustable transverse plate supported by said casing, a rotary throwing rotor mounted in the casing with its axis parallel to the plate and having a hub made of resiliently distortable material and subdivided rigid blades carried by said hub and arranged contiguously in rows parallel to the axis of rotation of said rotor, the free ends of said blade extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

5. A pargeting machine comprising a casing into which material is fed, an adjustable transverse plate supported by said casing, a rotary throwing rotor mounted in the casing with its axis parallel to the plate and having a hub made of resiliently distortable material and provided with peripheral projections of same resilient material, and rigid blades inserted at one end in said projections of the hub and the free ends of which extend sufficiently from said hub to scrape successively on said plate according to the resilient distortion of the corresponding projection and of the corresponding part of said hub when passing thereunder for generating a catapulting effect without flexion of said blades, and means for adjusting the relative position of said plate with respect to said casing with a view to vary said catapulting effect.

6. A pargeting machine comprising a casing into which material is fed, an adjustable transverse plate supported by said casing, a rotary throwing rotor mounted in the casing with its axis parallel to the plate and having a hub made of resiliently distortable material and rigid blades having a tail part for anchoring in said hub and the free ends of which extend sufficiently from said hub to scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

7. A pargeting machine comprising a casing into which material is fed, an adjustable transverse plate supported by said casing, a rotary throwing rotor mounted in the casing with its axis parallel to the plate and having a hub made of resiliently distortable material, rigid rods inserted in said hub parallel to the axis of rotation of said rotor and rigid blades pivotally mounted on said rods and engaged at one end in the resilient material of said hub, the free ends of said blades extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

8. A pargeting machine comprising a casing into which material is fed, an adjustable transverse plate supported by said casing, a rotary throwing rotor mounted in the casing with its axis parallel to the plate and having a hub made of resiliently distortable material and rigid blades provided at their base with elements of resilient material, said elements being engaged in corresponding perforations of the hub, the free ends of said bades extending sufficiently from said hub to contact and scrape sucessively on said plate according to the resilient distortion of the corresponding part of said hub when passing thereunder for generating a catapulting effect without flexion of said blades, and means for adjusting the relative position of said plate with respect to said casing with a view to vary said catapulting effect.

9 A pargeting machine comprising a casing into which material is fed, an adjustable transverse plate supported by said casing, a rotary throwing rotor mounted in the casing with its axis parallel to the plate and having a hub made of resiliently distortable material and rigid blades carried by said hub and shaped at their outer end like a trident the central tooth of which is longer than the lateral teeth which form projection spatulae, and the central teeth of said blades extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

10. A pargeting machine comprising a casing into which material is fed, an adjustable transverse plate supported by said casing, a rotary throwing rotor mounted in the casing with its axis parallel to the plate and having a hub made of resiliently distortable material and rigid blades carried by said hub and shaped at their free end like an elongated gutter, the free ends of said blades extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

11. A pargeting machine comprising a casing into which material is fed, an adjustable transverse plate supported by said casing, a rotary throwing rotor mounted in the casing with its axis parallel to the plate and having a hub made of resiliently distortable material and rigid blades carried by said hub and having corrugated free ends extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

12. A pargeting machine comprising a casing into which material is fed, an adjustable transverse plate supported by said casing, a rotary throwing rotor mounted in the casing with its axis parallel to the plate and having a composite hub the outer part of which at least is made of resiliently distortable material and rigid blades carried by said hub and the free ends of which extend sufficiently from said hub to scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

13. A pargeting machine comprising a casing into which material is fed, an adjustable transverse plate supported by said casing, a rotary throwing rotor mounted in the casing with its axis parallel to the plate and having a hub made of resiliently distortable material and rigid blades having a part radially inserted in said hub and an outer part rearwardly directed with respect to the direction of their movement, the free ends of said blades extending sufficiently from said hub to contact and scrape successively on said plate according to the resilient distortion of the corresponding part of said hub when passing thereunder for generating a catapulting effect without flexion of said blades, and means for adjusting the relative position of said plate with respect to said casing with a view to vary said catapulting effect.

MICHEL DAIGNAS.

REFERENCES CITED

The following references are of record in the file of this patent:

UNITED STATES PATENTS

| Number | Name | Date |
| --- | --- | --- |
| 833,893 | Petersen | Oct. 23, 1906 |
| 1,547,802 | Gasstrom | July 28, 1925 |
| 1,686,968 | Harber | Oct. 9, 1928 |
| 2,188,220 | Carlson | Jan. 23, 1940 |
| 2,279,621 | Hudson | Apr. 14, 1942 |

FOREIGN PATENTS

| Number | Country | Date |
| --- | --- | --- |
| 588,720 | Germany | 1933 |
| 426,878 | Great Britain | Apr. 11, 1935 |